United States Patent
Parker et al.

(10) Patent No.: US 7,104,191 B1
(45) Date of Patent: Sep. 12, 2006

(54) METHOD OF MAXIMIZING BALER THROUGHPUT

(75) Inventors: Paul David Parker, Ottumwa, IA (US); Darin Ledru Roth, Ottumwa, IA (US); Timothy John Trelstad, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/140,637

(22) Filed: May 27, 2005

(51) Int. Cl.
*B30B 15/30* (2006.01)
*B30B 15/00* (2006.01)

(52) U.S. Cl. .................. 100/51; 100/41; 100/45; 100/99; 56/10.2 R; 56/343; 700/17

(58) Field of Classification Search .......... 100/4, 100/35, 41, 45, 50, 51, 99, 100, 215, 218; 56/10.2 R, 10.2 A, 10.5, 341, 343, 432, 433, 56/DIG. 2, DIG. 15; 700/17, 28, 44, 45, 700/46; 701/50, 93, 110; 702/176
See application file for complete search history.

(56) References Cited

U.S. PATENT DOCUMENTS

| | | | |
|---|---|---|---|
| 4,108,062 A | | 8/1978 | White |
| 5,226,356 A | * | 7/1993 | Schrag et al. ............ 100/41 |
| 5,950,410 A | | 9/1999 | O'Brien et al. |
| 6,474,228 B1 | | 11/2002 | Leupe et al. |
| 6,543,342 B1 | | 4/2003 | Leupe et al. |
| 6,546,705 B1 | | 4/2003 | Scarlett et al. |
| 6,647,706 B1 | | 11/2003 | Vogt et al. |
| 6,651,416 B1 | | 11/2003 | Trelstad et al. |
| 6,786,143 B1 | * | 9/2004 | Leupe et al. ............ 100/4 |

FOREIGN PATENT DOCUMENTS

| | | |
|---|---|---|
| EP | 1 066 747 | 1/2001 |
| EP | 1 153 538 | 11/2001 |

* cited by examiner

*Primary Examiner*—Derris H. Banks
*Assistant Examiner*—Jimmy Nguyen

(57) ABSTRACT

A method is provided for determining the throughput of a parallelepiped agricultural baler. The baler has a feed duct communicating between a crop pick-up assembly and a baling chamber and the feed duct serves as a pre-compression chamber to accumulate crop to a predetermined density before the crop is transferred to the baling chamber. The transfer of the crop from the feed duct (pre-compression chamber) to the baling chamber is accomplished by a stuffer mechanism actuated in response to a crop density sensor associated with the feed duct (pre-compression chamber). The baler further has a plunger mechanism that compresses the crop into a column to form a bale in the baling chamber. The invention senses when the crop in the feed duct (pre-compression chamber) has reached a predetermined density for transfer to the baling chamber and when the plunger has attained a home position that allows for transfer of crop from the feed duct (pre-compression chamber) into the baling chamber. A wait time between when the feed duct (pre-compression chamber) has reached a predetermined density for transfer of crop to the baling chamber and the plunger is in the home position is calculated and displayed to an operator of the baler.

27 Claims, 3 Drawing Sheets

METHOD OF MAXIMIZING BALER THROUGHPUT

FIELD OF THE INVENTION

The present invention relates generally to agricultural balers. More particularly, the present invention relates to parallelepiped balers. Specifically, the present invention relates to a method of maximizing the throughput of crop in such a baler.

BACKGROUND OF THE INVENTION

Typical balers comprise a frame pulled by a tractor over a field to pick up hay, straw or other crop to be baled and feeding the crop into a baling chamber where it is compressed into bales. One common baler type creates parallelepiped shaped bales that are formed by a plunger which reciprocates inside a baling chamber. When the bales are complete a tying mechanism is actuated to bind the bale before it is ejected from the baler.

Typically the plunger reciprocates in the baling chamber against the crop material when a new charge of crop is introduced into the chamber. Crop is fed into the baler via a crop pick-up assembly located at ground level and a duct communicating between the pick-up assembly and the baling chamber. Crop is typically pre-compressed in the duct into uniform amounts prior to introduction into the baling chamber. A stuffer mechanism then transfers the pre-compressed crop into the baling chamber whenever enough crop material is made available in the duct.

There are four basic types of machine configurations possible with the plunger and stuffer combination. The first type has a continuous plunger, i.e. the plunger is gearbox driven and operates continuously, and a continuous stuffer. With this type of baler crop is continuously fed into a pre-compression chamber by e.g. a three cycle feed rake, each successive cycle filling the chamber and the third cycle moving the flake into the baling chamber where the plunger compresses the flake into a bale. With this continuous plunger-continuous stuffer design there is no guarantee of flake consistency (size, density). The feed rake is mechanically timed with the plunger operation resulting in a flake size that varies depending on how much crop is fed during the three cycles for each plunger stroke. This design does not work well if enough crop cannot be gathered in time to create a full flake. This results in bales that are soft at the top.

The second type of baler design also has a continuous plunger, but uses an intermittent stuffer. Here crop is fed into the pre-compression chamber to form a flake, the flake is then transferred into the baling chamber via an intermittently operating stuffer and then the plunger compresses the flake into the bale. With such continuous plunger-intermittent stuffer designs there is also no guarantee of flake consistency (size, density). For example, when the pre-compression chamber sensor reports that the pre-compression chamber is filled to the specified level, the stuffer may not immediately engage because the continuous plunger is not in the appropriate position. During the time between the pre-compression chamber sensor reporting "ready" and the plunger getting into position, additional crop is building up in the pre-compression chamber. The result is inconsistent flake size and density in the pre-compression chamber due to the system waiting on the plunger to get to the appropriate position. This design avoids the "soft top" as in the previous example but the flake size is still inconsistent.

The third type of known baler design uses an intermittent plunger i.e. the plunger is not gearbox driven but is driven e.g. hydraulically and the stuffer is driven continuously. With this continuous feeding system there is no pre-compression chamber and the crop is delivered directly into the baling chamber via a feed fork. A switch at the top of the bale chamber activates a plunger cycle when the baling chamber fills with crop and exerts pressure on the switch. Here the potential variations in flake size and density occur as the feeder mechanism throws crop up into the baling chamber activating the pressure switch.

The fourth and last type of known baler configuration also uses an intermittently driven plunger e.g. hydraulically driven, and also uses an intermittent stuffer. This type of system provides the greatest level of flake consistency as to size and density, because under ideal circumstances the intermittent plunger is always in the ready position when the signal is received that the pre-compression chamber is full. When the pre-compression chamber sensor indicates that sufficient crop has entered the pre-compression chamber a signal is sent to the intermittent stuffer which immediately begins to move the flake from the pre-compression chamber into the baling chamber. As the stuffer approaches a predetermined position the plunger movement is started. The result is improved flake consistency. This combination gives the best bale quality by having consistent density from top to bottom (due to the intermittent feed system) and consistent flake sizes (from the intermittent plunger system). With both systems being intermittent, the challenge is to appropriately synchronize the activation of the stuffer with that of the plunger.

With the second type of baler described above (continuous plunger-intermittent stuffer) the components are mechanically linked together and therefore operate at predetermined (non-adjustable) rates/ratios. The goal on machines like this is to match the throughput of the baler to some given ratio which would correspond to accumulating each flake in an exact whole number ratio to machine plunger strokes. Examples of this process are described in U.S. Pat. Nos. 6,474,228 and 6,543,342. With a baler like that of the fourth type described above (intermittent plunger-intermittent stuffer), the components (plunger and stuffer) are not linked together with a mechanical linkage so these ratios are not meaningful, instead the goal is to accumulate the predetermined flake of material so that the system, i.e. the combination of the stuffer and the plunger, runs continuously i.e. without any wait time.

With mechanically linked balers as described above, having a continuous plunger drive and an intermittent stuffer drive, the stuffer mechanism has the same cycle rate as the plunger and is typically driven through a one revolution clutch. This clutch is mechanically timed to the plunger so that the plunger is not covering the top opening of the accumulating duct when the stuffer is activated and so that the plunger begins compressing the flake and covers this opening before the stuffer retracts and returns to its home position. If the plunger travels just past the point that the one revolution clutch can be engaged when the chamber full signal is received, the chamber must continue receiving crop material for almost one full plunger cycle before the stuffer can be activated to lift the flake out of the duct and into the baling chamber. If set for maximum throughput, the duct (pre-compression chamber) cannot continue receiving material for this amount of time and the baler will plug. Ideally the chamber full signal is received just before the plunger reaches the point in its cycle that the one revolution clutch can be activated. This is the reason that integer ratios of pre-compression chamber fill time to plunger cycle time should be attained to avoid plugging the baler.

The problem with balers such as those described in U.S. Pat. Nos. 6,474,228 and 6,543,342 is that there are discrete areas of the function that must be avoided to prevent plugging of the machine. For example, one embodiment uses a ratio $T_f/T_p$ (where $T_f$ is the time required to fill the chamber to the desired density, and $T_p$ is the cycle time of the plunger). For maximum throughput this ratio should be 1. However, plugging problems can occur if this ratio is just above 1 or just above 2 or just above 3 etc. Therefore, if the ratio was just below 2 (an acceptable operating range) maximum throughput is not being achieved so the vehicle speed should be increased, but by increasing the speed the value of the ratio will begin to drop and as it passes through values just above 1 plugging can occur.

In another embodiment described in the above-referenced patents, a value of $(T_s-T_f)/T_s$ is generated (where $T_s$ is the cycle time of the stuffer mechanism). The problem with using this value as a control for the propelling vehicle speed is that this produces a discontinuous function and multiple $T_f$ values will give the same ratio value (because $T_s$ is an integer multiple of $T_p$ and increases to the next multiple if $T_f$ would be greater that $T_s$). Therefore if the resulting value is in the range that could be produced with multiple values of $T_f$, the system does not know which segment of the curve it is on without some additional information (it must know what multiple of $T_p$ is being used). Also the problem stated above applies here as well, values of $T_f$ that lie just beyond the discontinuities of the graph can cause plugging problems and need to be avoided.

Accordingly, there is a clear need in the art for a method for maximizing the throughput of a baler without the aforementioned problems.

SUMMARY OF THE INVENTION

The present invention is particularly applicable to balers wherein the components are not mechanically linked and more specifically to balers wherein the components are hydraulically driven. However, those having skill in the art will recognize that the method of the invention can apply to any type of baler drive system. For non-mechanically linked, hydraulically driven balers there is only one scenario that will give maximum throughput to the baler. This is when the plunger system (stuffer/plunger combination) has zero wait time between activations. The wait time is the amount of time between the 'chamber full' signal and the next 'cycle complete' signal. When the wait time is positive the system is running at something less than maximum throughput. If the wait time is negative, as is the case when the pre-compression chamber becomes full prior to the completion of the previous plunger system cycle, the system is exceeding capacity i.e. maximum theoretical throughput, allowing for a possible plugging situation.

In view of the foregoing, it is an object of the invention to provide a method for determining the current throughput of an agricultural baler and whether the maximum throughput capacity of the baler is being met or exceeded at any given point in the operation of the baler.

Another object of the invention is the provision of a means for displaying the current throughput of the baler relative to the maximum throughput capacity of the baler to enable the operator to adjust the operating speed of the baler to achieve maximum throughput.

A further object of the invention is to provide such a method which is compatible with known baling equipment and techniques.

In general, a method is provided for determining the throughput of a parallelepiped agricultural baler. The baler has a feed duct communicating between a crop pick-up assembly and a baling chamber and the feed duct serves as a pre-compression chamber to accumulate crop to a predetermined density before the crop is transferred to the baling chamber. The transfer of the crop from the feed duct (pre-compression chamber) to the baling chamber is accomplished by a stuffer mechanism actuated in response to a crop density sensor associated with the feed duct (pre-compression chamber). The baler further has a plunger mechanism that compresses the crop into a column to form a bale in the baling chamber. The invention senses when the crop in the feed duct (pre-compression chamber) has reached a predetermined density for transfer to the baling chamber and when the plunger has attained a home position that allows for transfer of crop from the feed duct (pre-compression chamber) into the baling chamber. A wait time between when the feed duct (pre-compression chamber) has reached a predetermined density for transfer of crop to the baling chamber and the plunger is in the home position is calculated and displayed to an operator of the baler.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
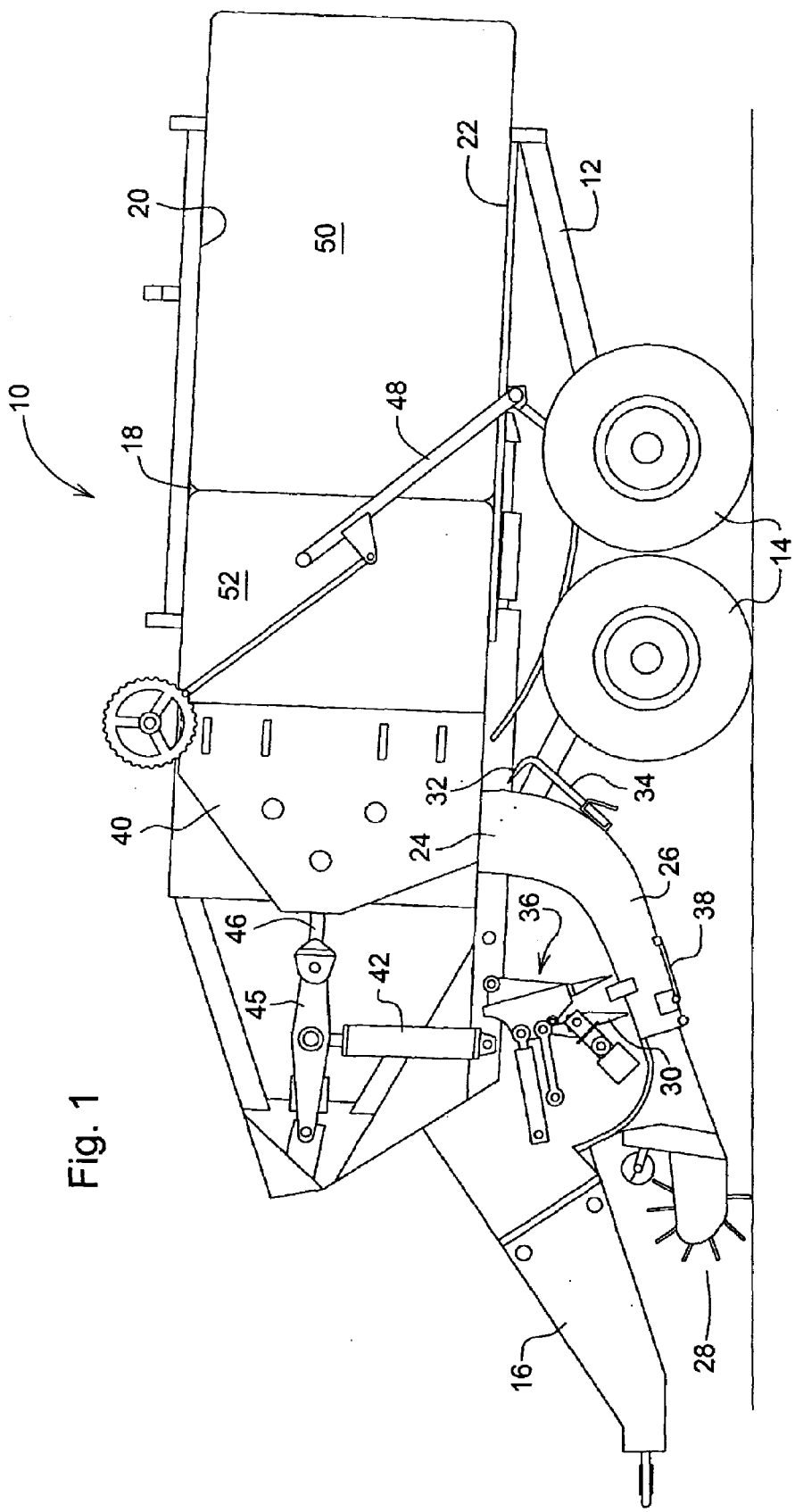
FIG. 1 is a somewhat schematic left side elevational view showing a large parallelepiped baler.

With reference now to the drawings it can be seen that a large parallelepiped baler is designated generally by the numeral 10. The baler 10 includes a frame 12 supported on a tandem set of ground wheels 14. A tongue 16 is fixed to and extends forwardly from the frame 12 and is adapted for being attached to a prime mover, such as an agricultural tractor (not shown) equipped with a power take-off shaft for supplying power for driving various driven components of the baler. A baling chamber 18 of rectangular cross section is defined in part by upper and lower walls 20 and 22, respectively, with the lower wall 22 being provided with a crop inlet 24 to which is attached a curved in-feed duct 26 which serves as a pre-compression chamber, as described below. A crop pick-up and center-feed auger assembly 28 is provided ahead of the duct for picking up a windrow of crop from the ground and delivering it to a packer fork assembly 30 which acts to pack crop into the duct 26 until a charge of a pre-selected density has accumulated downstream of fingers 32 of a backstop device 34, the device 34 being pivotally mounted for movement between a blocking position, wherein the fingers 32 project into the duct 26 in the vicinity of the inlet 24, and a feed position, wherein the fingers are withdrawn from the duct 26 to permit the charge of crop material to be stuffed into the baling chamber 18 via the inlet 24 by a stuffer fork assembly 36. Located in a lower front location of the duct 26 is a pivotally mounted, spring-loaded door 38 that pivots, in response to crop material located in the duct achieving a desired density, to effect energization of an electrical control circuitry (not shown) which actuates appropriate drive couplings which first cause the backstop device 34 to rotate so as to withdraw the fingers 32 from their blocking position shown in FIG. 1, and then to actuate the stuffer fork assembly 36 such that forks thereof sweep through the duct 26 and move the charge of material into the baling chamber 18. Once the charge of crop material is stuffed into the baling chamber 18, a plunger mechanism 40, which is mounted to a forward location of the frame 12 is operated, in controlled sequence after operation of the feeder fork assembly 36, to move the material rearwardly in the chamber 18 where it is compacted into a column. The plunger is driven by an extensible and retractable hydraulic actuator 42 that is connected for oscillating a crank 44 coupled to the plunger 40 by a connecting link 46. Upon the column of compressed crop material reaching a pre-selected length, a twine-delivery needle assembly 48, including a plurality of curved needles, is actuated to deliver a plurality of strands of twine respectively to a plurality of knotters (not shown) which act to tie lengths of twine about the pre-selected column length to form a bale 50 that is then ready for discharge, which will occur upon it being forced from the rear end of the chamber 18 by a bale portion 52 as it grows in length upon new charges of crop being stuffed into the chamber.

Figure 2:
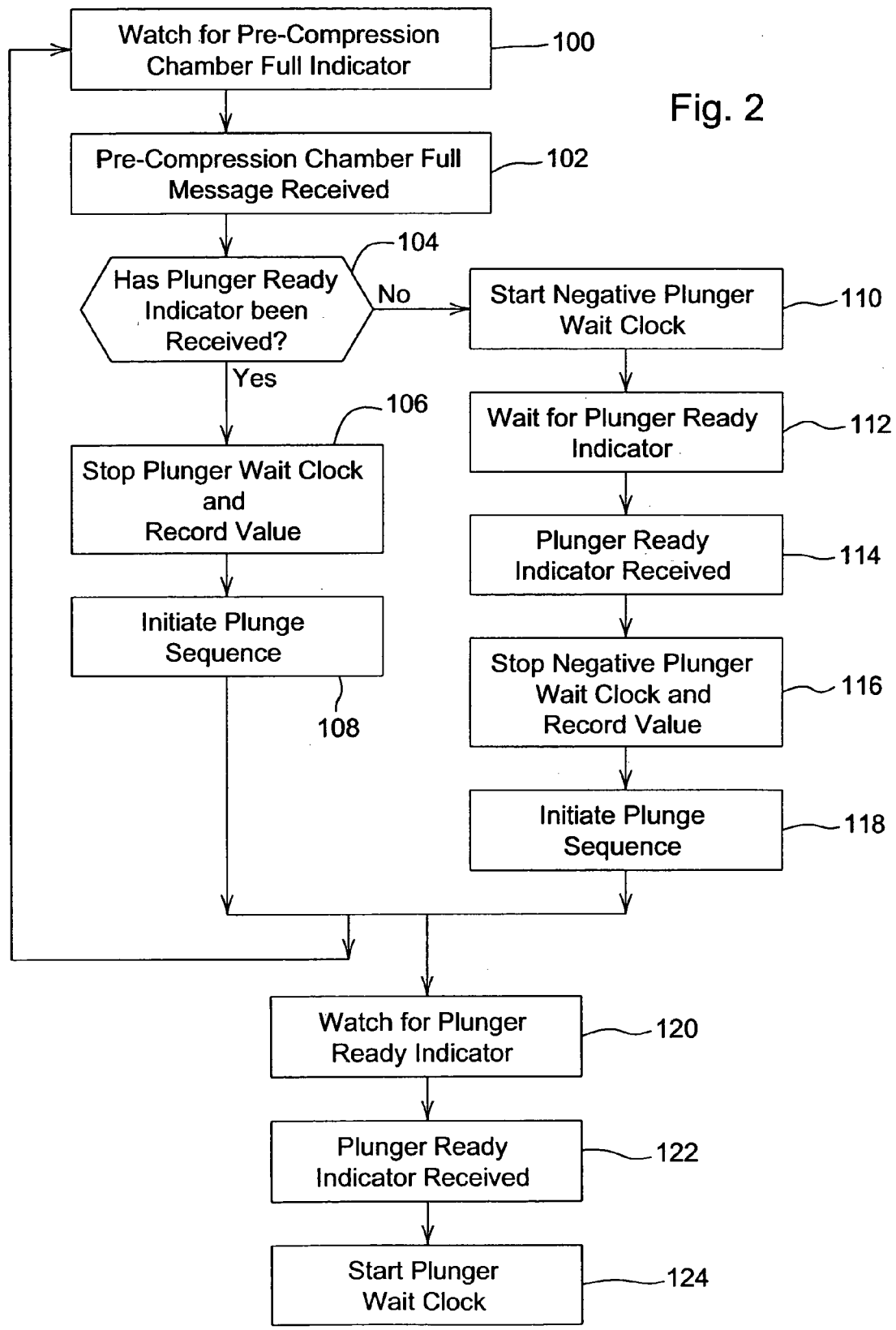
FIG. 2 is a flowchart illustrating the method of the present invention.

The steps of the method of the invention are described with reference to the flow chart of FIG. 2. The baler includes a CPU controller and software that uses two timers for calculating capacity. A Cycle Time Timer tracks the time from chamber full to cycle complete, and a Plunger Wait Timer is used to calculate capacity by timing how long the plunger is idle.

At startup the capacity is set at zero, the cycle time is set to a default value, and the Plunger Wait Timer is cleared. At the first plunger stroke the system will reset the cycle time to the time it takes to complete the first cycle.

The feed duct serving as a pre-compression chamber. Once the system is running, the software monitors the pre-compression chamber full condition as illustrated at 100 in FIG. 2. While waiting for the pre-compression chamber to fill, the Plunger Wait Timer is incremented until it reaches the current cycle time at which point it holds at that value (this represents zero percent capacity). When the chamber becomes full at 102, the software begins tracking cycle time with the Cycle Time Timer. The Cycle Time Timer continues to run from the time the chamber full message is received at 102 or when the plunge sequence is initiated at 108 (since they are essentially simultaneous) until the plunger ready indicator is received at 122 or 114 whichever occurs first. If this timer exceeds a predetermined maximum cycle time, the system goes back to waiting for the chamber to fill (this means that for some reason the previous cycle did not complete properly and it will not be used to calculate capacity or cycle time).

At 104 the software is checking to see if the plunger has returned to a position where it can start the next cycle. If the answer is "yes" at 106, the Plunger Wait Timer is stopped and the clock value is recorded. The plunger sequence is then initiated at 108. The capacity for the cycle is then computed using the following formula:

$$\text{Capacity}(\%) = ((\text{Cycle Time} - \text{Plunger Wait Time}) / \text{Cycle Time}) \times 100$$

Where Cycle Time is the most recent calculated cycle time and plunger wait time is the time the plunger has been idle. For the first cycle the plunger wait time will always be equal to the cycle time so capacity will be computed as zero percent. This first cycle will also set the Cycle Time to how long this cycle took (unless it exceeds the predetermined time as noted above).

If at 104 the chamber becomes full again while the system is waiting for the plunger, the capacity has exceeded 100%. To calculate the over capacity percent, the system uses a negative plunger wait clock at 110 to time how long it takes from when the chamber becomes full until the plunger is ready at 112 (cycle delay time). Once the plunger ready indicator is received at 114 the negative plunger wait clock is stopped and the value is recorded at 116. The plunger sequence is then initiated at 118 and capacity is then calculated as follows:

$$\text{Capacity}(\%) = ((\text{Cycle Time} + \text{Plunger Wait Time}) / \text{Cycle Time}) \times 100$$

Again, if the time for the plunger to become ready exceeds a predetermined time, the system will discard this capacity calculation and restart.

Once the plunger sequence is initiated at 108 or 118 the system goes back to watching for the chamber full indication at 100. If the plunger ready indicator is received at 122 before the next chamber full indicator is received at 100, the Plunger Wait Timer is started again at 124 and the system continues to wait for the chamber full signal at 100.

The capacity that is displayed is an average of the last three plunger cycles using the following formula:

$$\text{Displayed Capacity}(\%) = ((\text{Previous Capacity} \times 2) + \text{Current Capacity}) / 3$$

Figure 3:
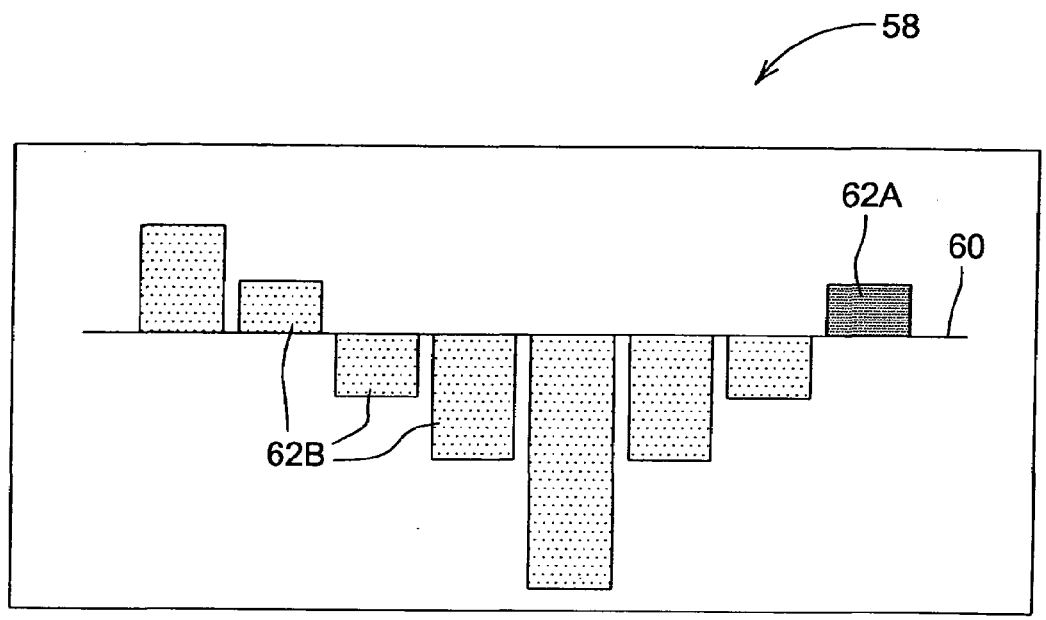
FIG. 3 is a view of a display showing how the current throughput capacity of the baler can be displayed to an operator; and, FIG. 4 is a schematic view of an integrated control system according to the invention.

The wait time information can be displayed to the operator in a number of different ways. One way is to display the actual wait time in seconds or some other unit of time. In this case a positive number would indicate that the user could increase the speed of the towing vehicle. A value of zero would indicate that maximum throughput is being achieved. A negative value would indicate a likely plugging situation and that the user should reduce the speed of the towing vehicle. Another way of displaying the information is in the form of a ratio or percentage so that maximum throughput occurs when the ratio equals 1 or 100%. As described above, the ratio would be calculated as (Cycle Time−Plunger Wait Time)/Cycle Time. This ratio could be multiplied by 100 to get a percentage. A ratio less than 1 or a percentage less than 100 would indicate to the operator that the vehicle speed can be increased while a ratio greater than 1 or a percentage greater than 100 would indicate a need to reduce speed to avoid a possible plugging situation. In a preferred embodiment the throughput of the baler is displayed graphically to the operator as illustrated in FIG. 3. As shown, the display 58 has a zero line 60 which represents maximum throughput. One or more bars 62 can be displayed on either side of the zero line 60 to indicate the present throughput of the baler. If bars 62 are indicated below the zero line 60, the baler is operating at less than maximum capacity and thus the operator could increase the speed of the vehicle. Conversely, if bars 62 are indicated above the zero line 60, the maximum throughput capacity of the baler is being exceeded and a plugging situation is possible indicating that the operator should slow the speed of the vehicle. A bar is generated for each plunger stroke. The dark shaded bar 62A indicates the most recent plunger stroke while the light shaded bars 62B indicate previous plunger strokes. Ideally the operator should adjust the speed of the baler so as to keep the bar 62A as close to the zero line 60 as possible without moving above the zero line 60 (exceeding maximum capacity). In the preferred embodiment the amplitude of the bars 62 is indicative as to the amount of over or under capacity, that is the bigger the bar 62 is, the farther away from optimum throughput capacity is the throughput of the baler.

Cycle time and wait time can be determined by several different methods. Cycle Time is defined as the length of time between Cycle Start and Cycle Complete. Cycle start can be triggered by the 'Chamber Full' signal as indicated at 102 of FIG. 2, a command from the CPU to the stuffer drive mechanism as at 108 or 118, or a sensor that indicates the beginning of stuffer movement. These three events are almost simultaneous and therefore could be used interchangeably. 'Cycle Complete' is when the plunger returns to a point where a new cycle can be started as at 122 or 114. This can be triggered by either an analog sensor that senses plunger position or by a discrete sensor that is triggered when the plunger passes a given position.

Wait time is then calculated for two different scenarios: a.) if the chamber full signal is received after a cycle start signal but before a cycle complete signal, the chamber full signal would trigger the start of a timer at 110 that would accumulate until the next cycle complete signal at 116 (this time value would be assigned as a negative wait time); and, b.) if the above chamber full signal is not received before the cycle complete signal, the cycle complete signal at 122 would start a timer at 124 that would accumulate until the next cycle start signal is generated at 106 (this time would be assigned as a positive wait time).

This method of assessing baler throughput could be used to control the propelling speed of the vehicle. Since the ratio or actual wait time number provides a continuous function that has only one desired point, the vehicle speed can be increased or decreased to maintain the stated goal. This speed change could be accomplished manually by the operator or by an integrated control system such as an electronic control, through the shifting of discrete transmission gears or by varying an Infinitely Variable Transmission (IVT). The speed changes could also be accomplished by the increase or decrease of engine speed, however this could vary the speed of the baler drive which would affect the maximum attainable throughput.

Figure 4:
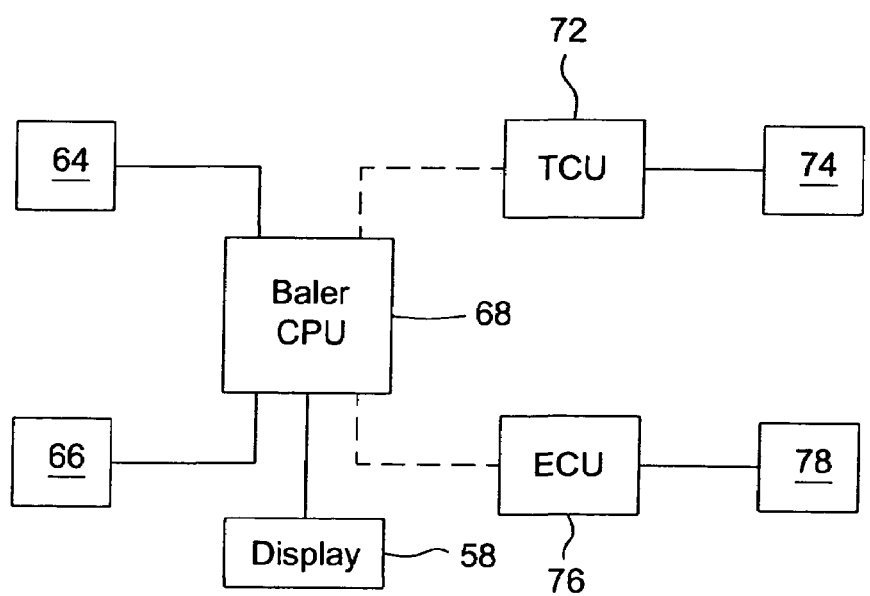

FIG. 4 schematically illustrates such an integrated control system. As shown, one or more sensors such as, for example, a crop density sensor 64 and a plunger position sensor 66 communicate with a baler CPU 68 to provide the signals for throughput management as described above. The throughput information from the CPU can be displayed to the operator via a display unit 58 as previously described. The output of the baler CPU 68 can also be fed to a transmission control unit 72 wherein the throughput information is processed for automatic control of a vehicle transmission 74. Likewise the output of the baler CPU 68 can be fed to an engine control unit 76 wherein the throughput information is processed for automatic control of a vehicle engine 78. Thus, the speed of the propelling vehicle can be either manually adjusted by the operator in response to a displayed baler throughput or automatically adjusted in response to baler throughput via control of the vehicle's transmission or engine.

Thus, it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A method of determining a throughput of a parallelepiped agricultural baler, the baler having a feed duct communicating between a crop pick-up assembly and a baling chamber, the feed duct serving as a pre-compression chamber to accumulate crop to a predetermined density before the crop is transferred to the baling chamber, the transfer of the crop from the feed duct to the baling chamber being accomplished by a stuffer mechanism actuated in response to a crop density sensor associated with the feed duct, the baler further having a plunger mechanism that compresses the crop into a column to form a bale in the baling chamber, the method comprising the steps of:
  sensing when the crop in the feed duct has reached a predetermined density for transfer to the baling chamber;
  sensing when the plunger has attained a home position that allows for transfer of crop from the feed duct into the baling chamber;
  calculating a wait time between when the feed duct has reached a predetermined density for transfer of crop to the baling chamber and the plunger is in the home position;
  displaying to an operator of the baler information indicative of a current baler throughput based upon the calculated wait time; and,
  adjusting a speed of the baler to approach a maximum throughput of zero wait time in response to the displayed current baler throughput.

2. A method of determining the throughput of a baler as set forth in claim 1 wherein a negative wait time indicates that the maximum throughput of the baler is being exceeded.

3. A method of determining the throughput of a baler as set forth in claim 1 wherein a positive wait time indicates that the maximum throughput of the baler is not being attained.

4. A method of determining the throughput of a baler as set forth in claim 1 wherein the baler has a non-mechanically linked intermittent stuffer and intermittent plunger mechanism.

5. A method of determining the throughput of a baler as set forth in claim 1 wherein the baler has a hydraulically operated intermittent plunger mechanism.

6. A method of determining the throughput of a baler as set forth in claim 1 wherein the baler includes a CPU and software for controlling operation of the plunger and stuffer mechanisms.

7. A method of determining the throughput of a baler as set forth in claim 6 wherein the CPU and software utilize one or more timers to determine current throughput of the baler.

8. A method of determining the throughput of a baler as set forth in claim 7 wherein the CPU and software utilize a cycle time timer and a capacity timer to determine current baler throughput.

9. A method of determining the throughput of a baler as set forth in claim 8 wherein the CPU and software determine current baler throughput by the steps of:
   incrementing the capacity timer while waiting for a pre-compression chamber full signal;
   when the pre-compression chamber full signal is received tracking and recording a cycle time using the cycle time timer;
   determining if the plunger is in a home position;
   if the plunger has reached a home position stopping a plunger wait time timer;
   calculating under capacity;
   if the pre-compression chamber becomes full before the plunger is in the home position, starting a negative plunger wait time timer;
   when the plunger reaches the home position, stopping the negative plunger wait time timer; and,
   calculating over capacity.

10. A method of determining the throughput of a baler as set forth in claim 1 wherein the current baler throughput is displayed to the operator in seconds.

11. A method of determining the throughput of a baler as set forth in claim 1 wherein the current baler throughput is displayed to the operator as a ratio.

12. A method of determining the throughput of a baler as set forth in claim 1 wherein the current baler throughput is displayed to the operator as a percentage.

13. A method of determining the throughput of a baler as set forth in claim 1 wherein the current baler throughput wait time is displayed to the operator by way of a graphical display on an electronic monitor.

14. A method of determining the throughput of a baler as set forth in claim 13 wherein the graphical display includes a zero line representing maximum baler throughput.

15. A method of determining the throughput of a baler as set forth in claim 14 wherein the graphical display includes one or more bars displayed on a first side of the zero line to represent baler operation below maximum capacity and one or more bars on a second side of the zero line to represent baler operation above maximum capacity.

16. A method of determining the throughput of a baler as set forth in claim 15 wherein the amplitude of each bar corresponds to an amount of over or under capacity.

17. A method of determining the throughput of a baler as set forth in claim 16 wherein each of the one or more bars represents a single plunger stroke.

18. A method of determining the throughput of a baler as set forth in claim 9 wherein the cycle time is determined by the length of time between cycle start and cycle complete.

19. A method of determining the throughput of a baler as set forth in claim 18 wherein the cycle start is determined by a pre-compression chamber full signal.

20. A method of determining the throughput of a baler as set forth in claim 18 wherein the cycle start is determined by a command from the CPU to start the stuffer mechanism.

21. A method of determining the throughput of a baler as set forth in claim 18 wherein the cycle start is determined by a signal from a sensor which senses the start of the stuffer mechanism operation.

22. A method of determining the throughput of a baler as set forth in claim 18 wherein the cycle complete is determined by a sensor which detects when the plunger is in the home position.

23. A method of determining the throughput of a baler as set forth in claim 1 wherein the speed of the baler is controlled manually by the operator shifting transmission gears in response to the current baler throughput.

24. A method of determining the throughput of a baler as set forth in claim 1 wherein the speed of the baler is controlled manually by the operator changing engine speed in response to the current baler throughput.

25. A method of determining the throughput of a baler as set forth in claim 1 wherein the speed of the baler is controlled automatically by electronic control of a gear transmission in response to the current baler throughput.

26. A method of determining the throughput of a baler as set forth in claim 1 wherein the speed of the baler is controlled automatically by electronic control of an infinitely variable transmission in response to the current baler throughput.

27. A method of determining the throughput of a baler as set forth in claim 1 wherein the speed of the baler is controlled automatically by electronic control of engine speed in response to the current baler throughput.

* * * * *